Feb. 15, 1927.
W. W. LINDBLOM
1,618,098
DROP BRAKE STAFF MECHANISM
Filed Aug. 10, 1926    2 Sheets-Sheet 2
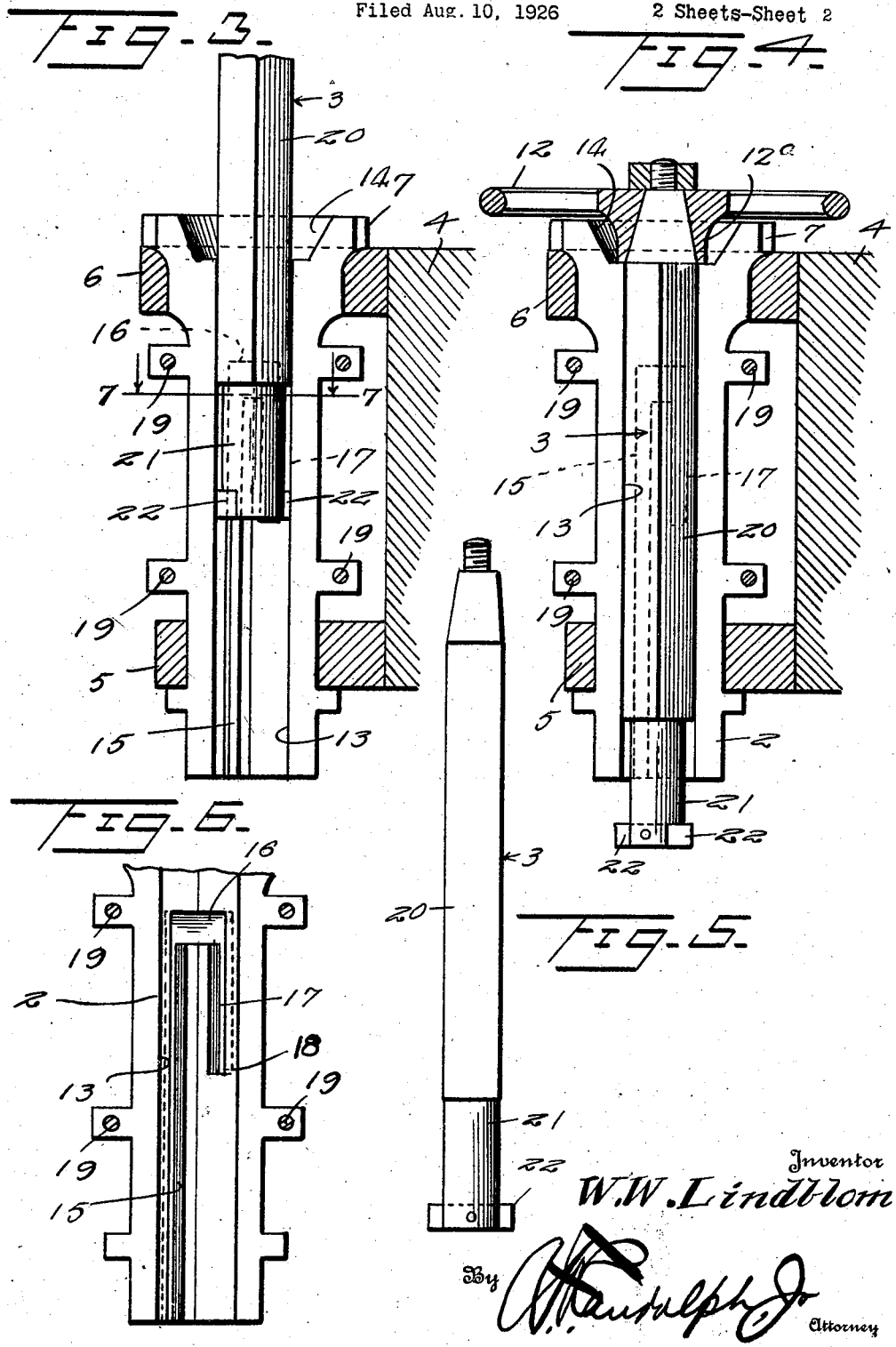
Inventor
W. W. Lindblom
Attorney Patented Feb. 15, 1927.

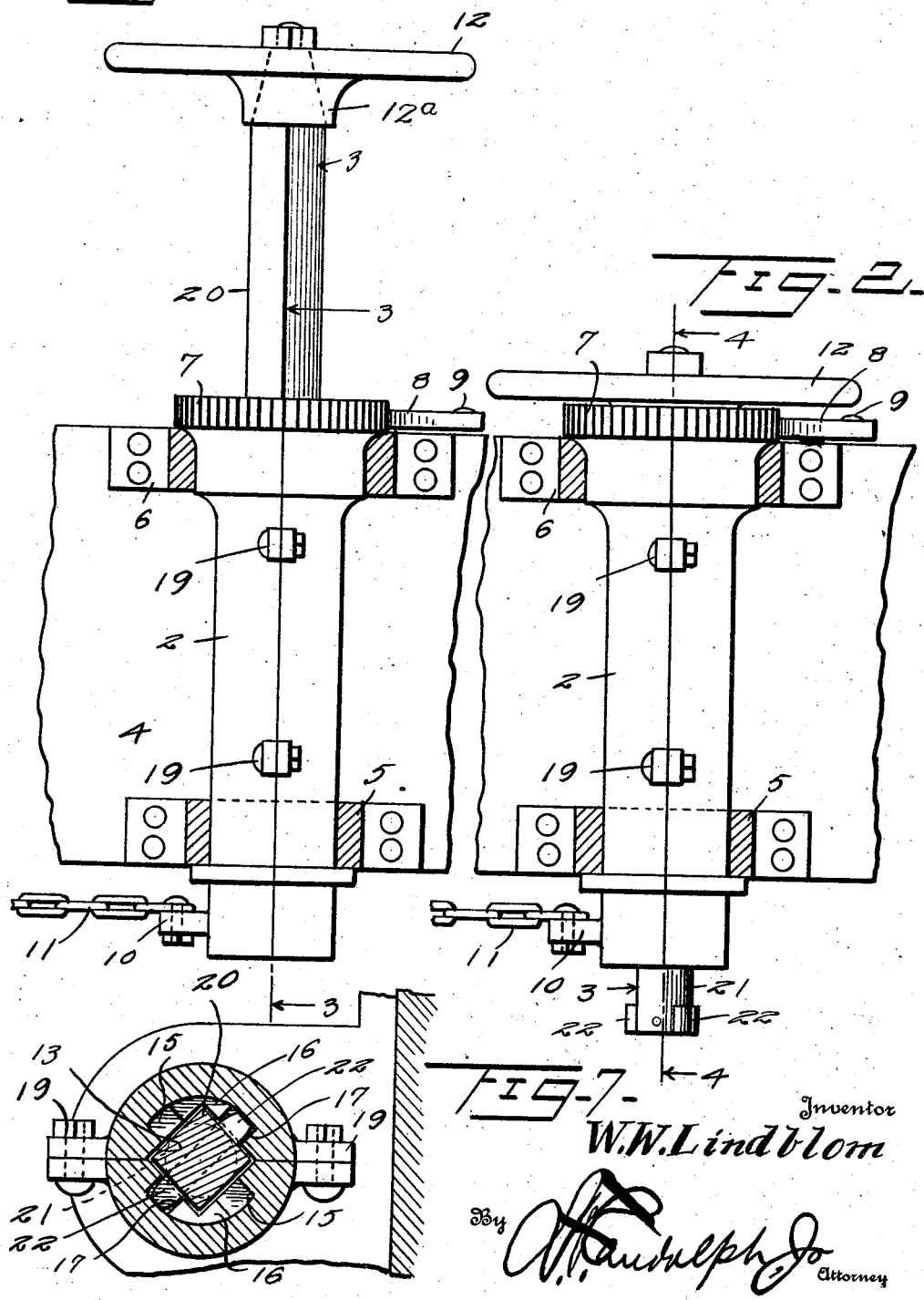

1,618,098

UNITED STATES PATENT OFFICE.

WILLIAM W. LINDBLOM, OF IRON MOUNTAIN, MICHIGAN.

DROP-BRAKE-STAFF MECHANISM.

Application filed August 10, 1926. Serial No. 128,467.

This invention relates to a brake staff mechanism for railway cars, and has for one of its objects to provide a mechanism of this character including a drum to which the brake chain is secured, a staff to which the hand wheel is secured and which is slidably associated with the drum to permit it to be adjusted into a raised or lowered position with respect to the drum, and novel means for supporting the staff in its raised position against any possibility of its casual movement from such position.

The invention is hereinafter more fully described and claimed, and is illustrated in the accompanying drawings wherein:

Figure 1 is an elevational view of a brake staff mechanism constructed in accordance with my invention, the brake staff being shown in raised position, Figure 2 is a similar view with the brake staff in lowered position, Figure 3 is a sectional view taken on the vertical plane indicated by the line 3—3 of Figure 1, Figure 4 is a similar view taken on the vertical plane indicated by the line 4—4 of Figure 2, Figure 5 is a view in elevation of the staff, Figure 6 is a detail sectional view of the drum, and Figure 7 is a sectional view taken on the horizontal plane indicated by the line 6—6 of Figure 3.

Corresponding and like parts are referred to in the following description, and designated in the several views of the accompanying drawings, by similar reference characters.

The mechanism comprises a drum 2 and a staff 3 which are telescopically associated. The drum 2 is shown rotatably supported on an end sill 4 of a railway car by the usual brake staff step 5 and bearing bracket 6. The upper end of the drum 2 is diametrically enlarged and provided with ratchet teeth 7. A pawl 8 pivoted as at 9 upon the bearing bracket 6, cooperates with the ratchet teeth 7 to hold the drum 2 against casual movement in unwinding direction. The drum 2 is provided with an apertured lug 10 to which a brake chain 11 is secured. A hand wheel 12 is secured to the upper end of the staff 3, and the upper end of a bore 13 of the drum 2 is provided with a conical recess 14 for the reception of the hub 12ª of the hand wheel 12 when the staff 3 is in lowered position.

Below the recess 14, the bore 13 is of polygonal formation in cross section, and is provided with vertical grooves 15 which communicate at their upper ends by way of horizontal grooves 16, with the upper ends of opposed grooves 17. The grooves 15 open out through the lower end of the bore 13, the grooves 16 extend in opposite directions from the upper ends of the grooves 15 and the grooves 17 terminate short of said end of the bore and their lower ends constitute shoulders 18. To permit the grooves 15, 16 and 17 to be readily formed, the drum 2 may be made in sections and the sections thereof may be connected together as shown at 19.

The staff 3 is of polygonal formation in cross section for the major portion of its length, as shown at 20 and is provided with a cylindrical lower end 21. It may be adjusted into a raised or lowered position with respect to the drum, as shown in Figures 1 and 2, respectively, and is supported in raised position with respect to the drum 2 by means of lugs 22 projecting in opposite directions from its cylindrical end 21 into the grooves 17 and resting upon the shoulders 18. When the lugs 22 are resting upon the shoulders 18 the lower end of the polygonal portion 20 of the staff 3 is positioned in the upper end of the polygonal portion of the bore 13, and due thereto a driving connection is established between the staff and drum 2. When it is desired to adjust the staff 3 into its lowered position with respect to the drum 2, the staff is first raised until its lugs 22 are in alinement with the grooves 16, then turned until the lugs are in alinement with the grooves 15 and then moved downwardly. When the lugs 22 are in contact with the upper end walls of the grooves 17 they are in alinement with the grooves 16, and when they are in contact with the remote end walls of the grooves 16 they are in alinement with the grooves 15, and in view thereof the staff 3 may be easily and quickly adjusted into its lowered position with respect to the drum 2. When it is desired to adjust the staff 3 into its raised position with respect to the drum 2, it is first raised until the lugs 22 are in alinement with the grooves 16, then turned until the lugs are in alinement with the grooves 17, and thence lowered until the lugs rest upon the shoulders 18. When the lugs 22 are in contact with the upper end walls of the grooves 15 they are in alinement with the grooves 16, and when in contact with the remote end walls of the grooves 16 they are in alinement with the grooves 17, and due thereto the staff 3 may be easily and quickly adjusted into its raised position with respect to the drum and secured in interlocking connection with respect to the drum. As the staff 3 must, before it can be adjusted into its lowered position with respect to the drum 2, be first raised until the lugs 22 are in alinement with the grooves 16 and then turned until the lugs are in alinement with the grooves 15, there is no possibility of the casual movement of the staff into lowered position. When the lugs 22 are in alinement with the grooves 16, the cylindrical portion 21 of the staff 3, and no part of its polygonal portion 20, is located in the polygonal portion of the bore 13, and due thereto the staff may be turned to position the lugs in alinement with the grooves 15 or 17 depending upon whether it is wished to adjust the staff into its lowered or raised position with respect to the drum 2. The staff 3 may be inserted in the drum 2 through the lower end of the latter, and after it has been passed through the drum the hand wheel 12 is secured to its upper end.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:—

1. A brake staff mechanism comprising a drum provided with a polygonal bore, said drum being provided between its ends with an interior shoulder and having an interior groove extending from one end thereof to the shoulder, a staff having polygonal and cylindrical portions and telescopically associated with the drum for adjustment into a raised or lowered position with respect thereto, and a lug carried by the cylindrical portion of the staff and fitting in said groove and adapted to rest upon the shoulder to support the staff in raised position.

2. A brake staff mechanism comprising a drum provided with a polygonal bore and provided in the wall of said bore with a shoulder and a groove extending upwardly and downwardly from said shoulder, a staff telescopically associated with the drum for adjustment into a raised or lowered position with respect thereto and having polygonal and cylindrical portions, and a lug carried by the cylindrical portion of the staff and fitting in said groove and adapted to rest upon the shoulder to support the staff in raised position.

3. A brake staff mechanism comprising a drum having a polygonal bore having an enlarged upper end, the wall of the lower portion of the bore being formed to provide a shoulder and a groove extending upwardly and downwardly from the shoulder, a staff telescopically associated with the drum for adjustment into a raised or lowered position with respect thereto and having polygonal and cylindrical portions, a lug carried by the cylindrical portion of the staff and fitting in said groove and adapted to rest upon the shoulder to support the staff in raised position, and a hand wheel secured to the upper end of the staff and having a hub adapted to fit in the enlarged portion of the bore of the drum when the staff is in lowered position.

4. A brake staff mechanism comprising a drum provided with a polygonal bore, the wall of said bore being formed to provide an angular groove terminating at one end in a shoulder, a staff telescopically associated with the drum for adjustment into a raised or lowered position with respect thereto and provided with polygonal and cylindrical portions, and a lug carried by the cylindrical portion and fitting in said groove and adapted to rest upon said shoulder to support the staff in raised position.

In testimony whereof I affix my signature.

WILLIAM W. LINDBLOM.